(12) United States Patent  
Wähling et al.

(10) Patent No.: US 7,871,331 B2  
(45) Date of Patent: Jan. 18, 2011

(54) ELASTIC JOINT MEMBER

(75) Inventors: Werner Wähling, Kraiburg (DE); Wolfgang Spaan, Kraiburg (DE)

(73) Assignee: SGF Suddeutshe Gelenksheibenfabrik GmbH & Co. KG, Waldkraiburg (DE)

( * ) Notice: Subject to any disclaimer, the term of this patent is extended or adjusted under 35 U.S.C. 154(b) by 596 days.

(21) Appl. No.: 11/814,743

(22) PCT Filed: Jan. 16, 2006

(86) PCT No.: PCT/EP2006/000327

§ 371 (c)(1),
(2), (4) Date: Feb. 19, 2008

(87) PCT Pub. No.: WO2006/079461

PCT Pub. Date: Aug. 3, 2006

(65) Prior Publication Data

US 2008/0261705 A1 Oct. 23, 2008

(30) Foreign Application Priority Data

Jan. 25, 2005 (DE) .................. 10 2005 003 459

(51) Int. Cl.
*F16D 3/62* (2006.01)

(52) U.S. Cl. .......................................... 464/69; 464/93
(58) Field of Classification Search .................. 464/69, 464/93–95

See application file for complete search history.

(56) References Cited

U.S. PATENT DOCUMENTS

| 4,380,442 A | 4/1983 | Amsel |
| 4,790,794 A | 12/1988 | Takeda et al. |
| 6,899,629 B2 * | 5/2005 | Kotsusa ................. 464/69 |

FOREIGN PATENT DOCUMENTS

| DE | 39 42 432 | 5/1991 | |
| DE | 197 42 359 | 4/1999 | |
| DE | 197 42 361 | 5/2000 | |
| EP | 1 469 218 | 10/2004 | |
| FR | 52 571 | 4/1945 | |
| JP | 63-34325 A * | 2/1988 | ............. 464/69 |
| JP | 3-96718 A * | 4/1991 | ............. 464/69 |

* cited by examiner

*Primary Examiner*—Greg Binda
(74) *Attorney, Agent, or Firm*—Woodard, Emhardt, Moriarty, McNett & Henry LLP

(57) ABSTRACT

An elastic joint member (10) with at least one set of loops (12) and at least two bushes (14), which extend transversely through the set of loops (12), collars (16), which are fastened to a respective bush end (22) in order to axially support the set of loops (12) on the relevant bush (14), and an elastomeric envelope (18), in which the set of loops (12) and the bushes (14) are embedded at least in part. Also according to the invention, the areas of the bushes (14) which are left free by the collars (16) and embedded in the envelope (18) are smooth, and the collars (16) are locked onto the associated bush (14) with a clearance which is such that the bush is rotatable within the collars, while these are connected in a fixed manner to the envelope (18).

6 Claims, 4 Drawing Sheets ly described. The invention is based on the recognition that deviations of this kind can arise due to the occurrence when fitting joint members according to the invention in a shaft train of twisting of individual or all of the bushes and the associated collars which is slight and therefore hitherto considered irrelevant causing one or the other set of loops enveloped with rubber to be prestressed in an unplanned manner and the elastic joint member concerned consequently being unevenly loaded during operation.
ELASTIC JOINT MEMBER

REFERENCE TO RELATED APPLICATIONS

The present application is a national stage of International Patent Application PCT/EP2006/000327, filed 16 Jan. 2006, which claims the benefit of German Patent Application Serial No. 10 2005 003 459.4, filed 25 Jan. 2005, all of which are hereby incorporated by reference.

BACKGROUND OF THE INVENTION

1. Field of the Invention

The invention relates to an elastic joint member with at least one set of loops, at least two bushes, which extend transversely through the set of loops, collars, which are fastened to a respective bush end in order to axially support the set of loops on the relevant bush, and an elastomeric envelope, in which the set of loops and the bush are embedded at least in part.

2. Description of the Prior Art

Elastomeric joint members of this kind are commonly used, for example in the form of joint discs, for the cardanic connection of shafts, in particular in the drive train of motor vehicles. When joint members of this kind are assembled the bushes are fastened to shaft flanges or the like by means of threaded bolts, rivets or the like which are passed through them.

DE 3942432 C1 discloses an elastic joint member in the form of a joint disc in the case of which a plurality of sets of loops are assembled in an overlapping manner to form a ring and held together by cylindrical bushes which are passed through the overlap areas of the sets of loops. The sets of loops are fixed in the axial direction by pressing a collar onto each bush end before the entire arrangement is introduced into a vulcanising mould, in which it is given its elastomeric envelope. The collars are metal rings of an L-shaped profile which are connected to the bush not only in an axially non-displaceable manner but also in a rotationally rigid manner by pressing them onto a respective bush end. In order to prevent the bushes together with the collars fastened thereto from twisting upon tightening screws which are used to assemble the joint disc and thereby the total or partial destruction of the adhesive connection between the bushes as well as the sets of loops wrapping around them and the surrounding rubber, the bushes have at each end at least one sharp-edged projection which is hard enough to press into an associated shaft flange or the like when the associated fastening screw is tightened.

DE 19742361 A1 discloses elastic joint members which likewise comprise at least one set of loops as well as bushes which are provided with collars, in which case the sets of loops can likewise be assembled to form a self-contained ring. However here the bushes are formed as collar bushes with a respective bush part and a respective first collar, which is formed integrally onto the latter, as well as a locking arrangement at the end of the bush part which is remote from the first collar. Together with this locking arrangement, a complementary locking arrangement at a second collar forms a snap connection which is fixed axially and rotationally. The two collars have axially parallel holes into which the elastomeric envelope penetrates during vulcanisation, so that the collars, and with them also the bush parts, are firmly anchored.

The problem underlying the invention is that, in a statistically relevant number of cases, shaft trains which incorporate one or a plurality of elastic joint member(s) of the described type exhibit hitherto inexplicable deviations from the expected rotational vibration behaviour and also fail to attain their service life normally to be expected in spite of the measures initially described. The invention is based on the recognition that deviations of this kind can arise due to the occurrence when fitting joint members according to the invention in a shaft train of twisting of individual or all of the bushes and the associated collars which is slight and therefore hitherto considered irrelevant causing one or the other set of loops enveloped with rubber to be prestressed in an unplanned manner and the elastic joint member concerned consequently being unevenly loaded during operation.

The object of the invention is therefore to create conditions, through the very formation of an elastic joint member, to prevent stress accumulations in the joint member which are inconvenient during operation without the care taken when fitting the joint member having to meet unrealistically high requirements.

SUMMARY OF THE INVENTION

Starting out from an elastic joint member of the type initially described, the object is achieved according to the invention in that the areas of the bushes which are left free by the collars and embedded in the envelope are smooth and the collars are locked onto the associated bush with a clearance which is such that the bush is rotatable within the collars, while these are connected in a fixed manner to the envelope.

The invention therefore follows a path which is diametrically opposite to that which is known from DE 3942432 C1. Instead of the bushes being prevented from also turning when an associated fastening screw is tightened by a sharp-edged projection at one of their ends, or by a number of projections of this kind, according to the invention all conditions are created for allowing each bush to rotate as easily as possible in the collars fastened thereto in an axially non-displaceable manner when it is subject to a torque when the elastic joint member is assembled, in particular when a fastening screw is tightened. The smooth form of the external circumferential surfaces of the bushes which are left free by the collars prevents a rotating bush from giving rise to appreciable strain in a set of loops wrapping around it. Moreover, the free rotatability of the bushes within their collars prevents a torque which could lead to strain in the areas of the elastic envelope lying against the collar from being transmitted from a rotating bush to an associated collar.

Advantageous developments of the invention are comprised in the subclaims.

BRIEF DESCRIPTION OF THE DRAWINGS

Embodiments of the invention are illustrated in the following on the basis of schematic drawings, in which.

DESCRIPTION OF THE PREFERRED EMBODIMENT

Figure 1:
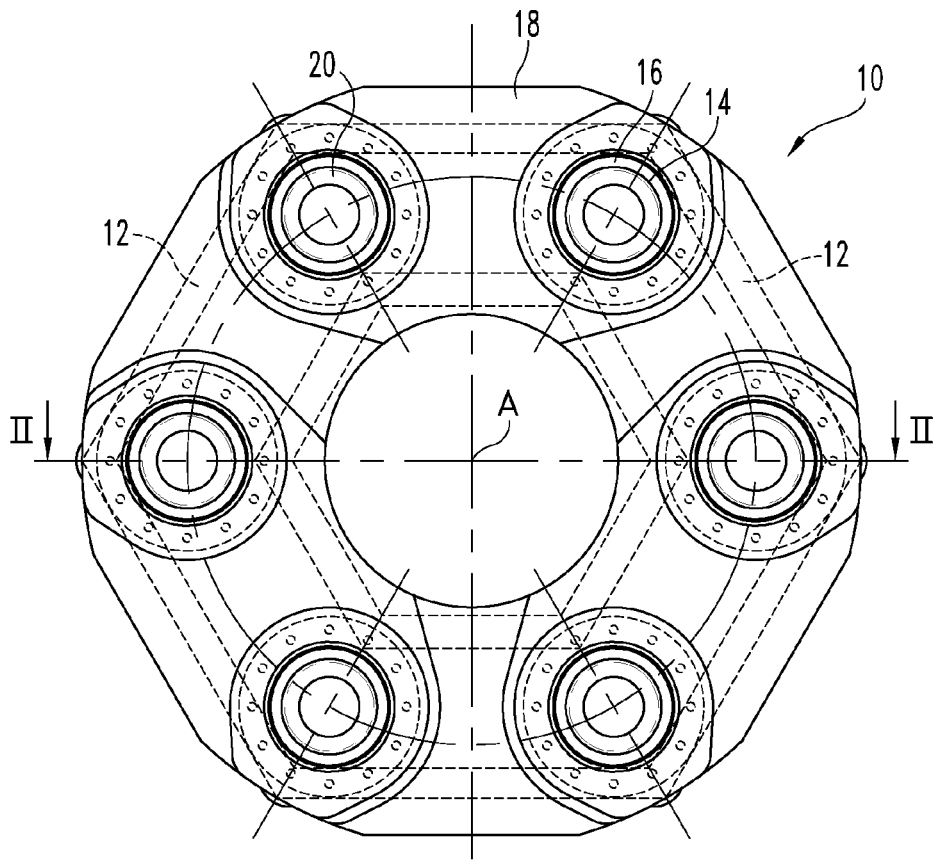
FIG. 1 is an axial view of a joint member.
Figure 2:
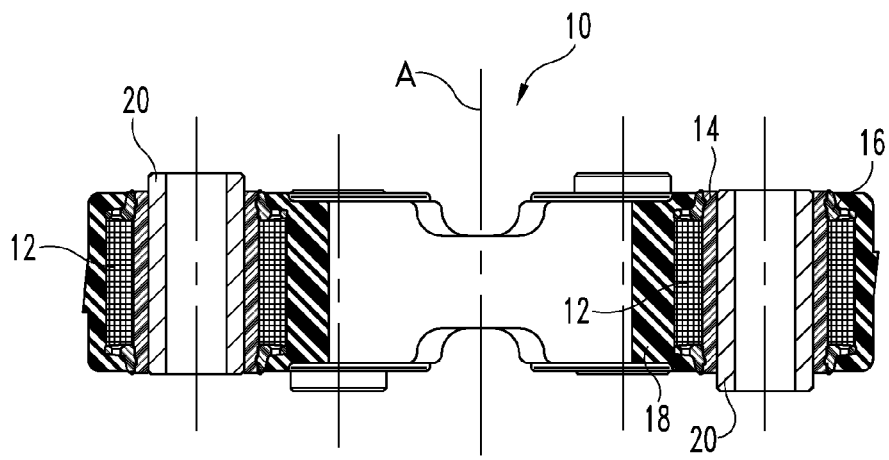
FIG. 2 is the section II-II in FIG. 1.
Figure 3A:
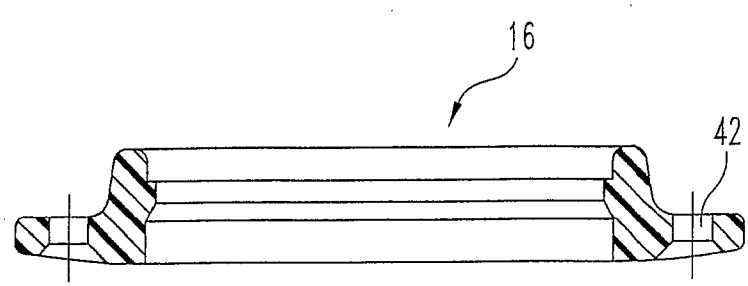
FIG. 3A is an enlarged view of collar 16 shown in FIG. 2.
Figure 3B:
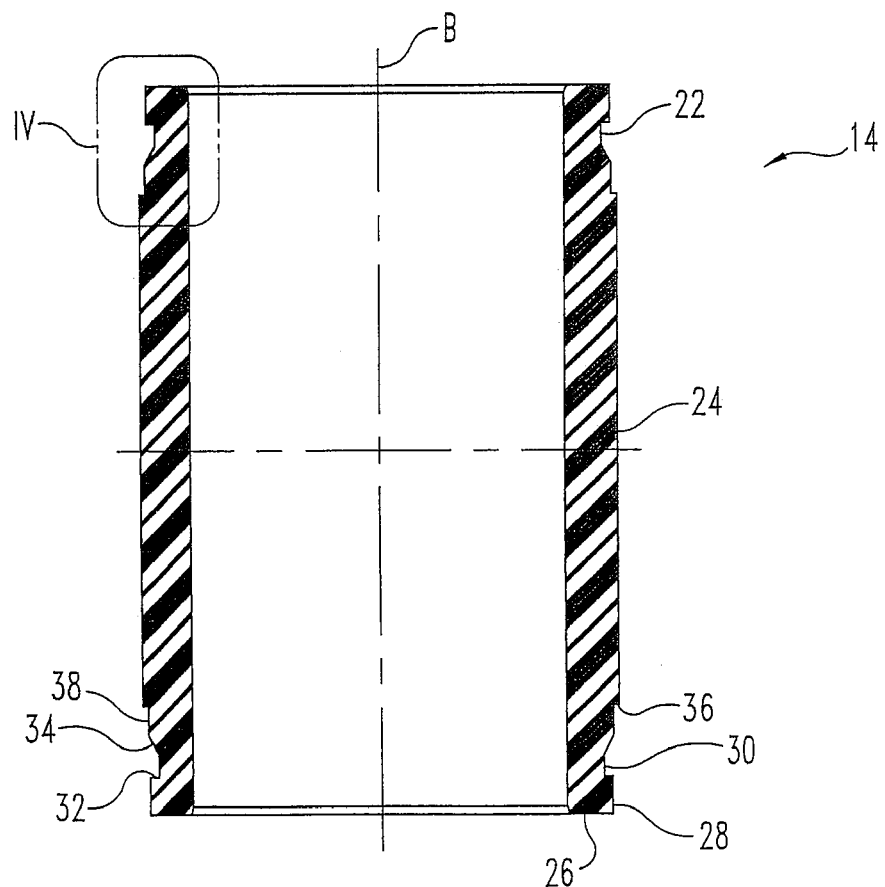
FIG. 3B is an enlarged view of bush 14 shown in FIG. 2.
Figure 4:
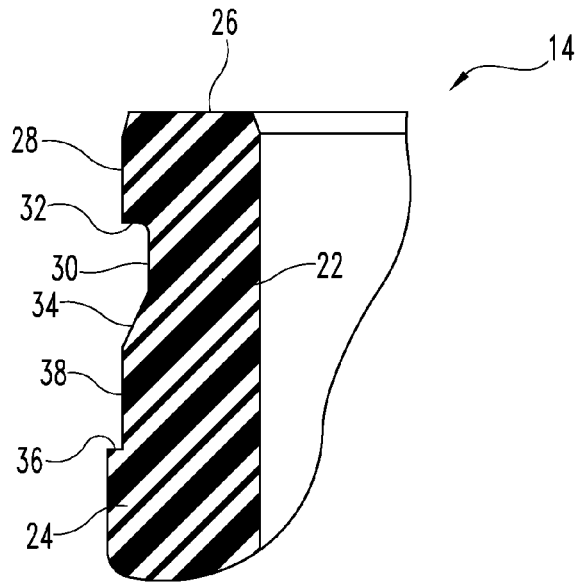
FIG. 4 is the detail IV in FIG. 3B, further enlarged.

FIGS. 1 and 2 represent a joint member 10 in the form of a joint disc which is provided to connect together two shafts in the drive train of a motor vehicle. In the represented example the joint member 10 incorporates six sets of loops 12 which each wrap around two bushes 14 such that adjacent sets of loops intersect. The bushes 14 are disposed at uniform distances from one another around a central axis A and are each provided with two locked-on collars 16. All of the sets of loops 12 as well as substantially the bushes 14 and parts of each of the collars 16 are embedded in an elastic envelope 18 of vulcanised rubber. A cylindrical inner bush 20 of steel is inserted with an interference fit in each of the bushes 14.

The bushes 14 consist of plastics material, preferably high-performance thermoplastic, which can be exposed to a service temperature of at least 180° C., is inherently flame-resistant, is highly hard and rigid, has a very low tendency to creep, even at elevated temperatures, is resistant to chemicals and scarcely hygroscopic, has a high modulus of elasticity in tension and flexure and, in conjunction with the pressed-in inner bush 20, has a high long-term strength. For example, plastics material with a modulus of elasticity in tension of at least 14000 MPa, a modulus of elasticity in compression of at least 15000 MPa and an elongation at break of approximately 1.9% is suitable. The plastics material which is used should have the lowest tendency possible to adhere to the rubber of the elastic envelope 18. The cylindrical external circumferential surfaces of the bushes 14 are preferably polished in order to keep the adhesive power as low as possible.

The collars 16 consist of a plastics material whose properties are similar to those of the bushes 14, with the exception that the plastics material which is used for the collars 16 preferably has sufficient elasticity to be joined to the bush 14 as well as good adhesiveness to the elastomer of the elastic envelope 18. For example, plastics material with a tear strength of 200 MPa and an elongation at break-of 3.9% is suitable for the collars 16.

All the bushes 14 are identical to one another; they each have two identical bush ends 22 and a cylindrical bush main part 24 lying in between. Each bush end 22 has a plane annular front face 26; this is adjoined by a first cylindrical portion 28, the diameter of which is perceptibly smaller than that of the bush main part 24. This is followed by a recess 30, which is likewise cylindrical and significantly reduces the diameter of the bush end 22 further. The recess 30 is demarcated from the first cylindrical portion 28 by a first shoulder 32, which is normal to the bush axis B, and passes at an axial distance from this shoulder into a conical face 34, the diameter of which increases with the distance from the first shoulder 32. The conical face 34 ends at an axial distance from a second shoulder 36; the interspace between this and the end of the conical face 34 is bridged by a second cylindrical portion 38, the diameter of which corresponds with that of the first cylindrical portion 28.

Figure 5:
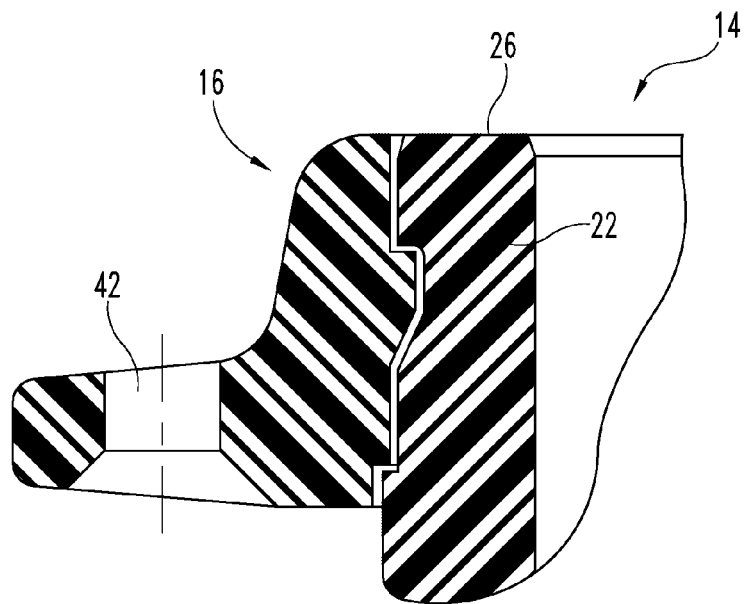
FIG. 5 is a corresponding detail of the assembled sub-unit from FIG. 3A and FIG. 3B.
Figure 6:
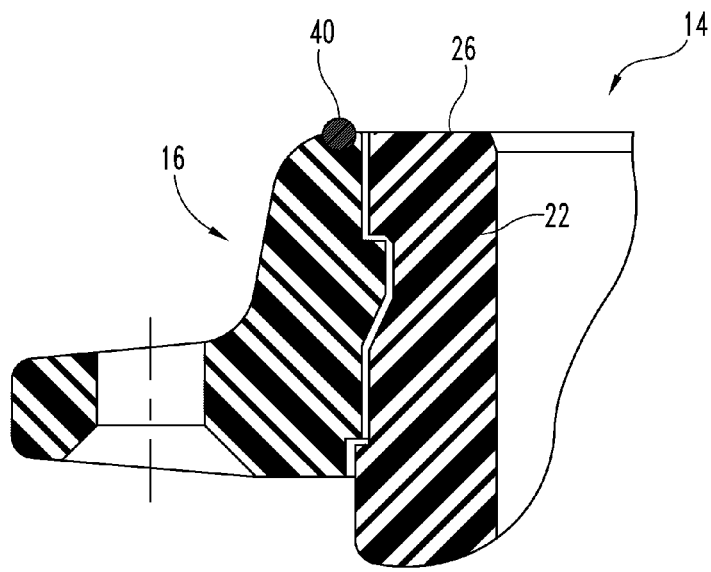
FIG. 6 is a development of FIG. 5
Figure 7:
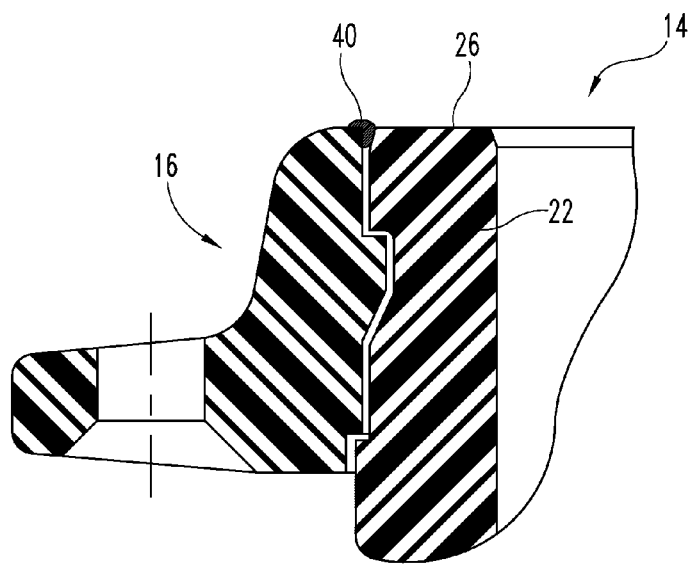
FIG. 7 is a modification of FIG. 6.

Each of the collars 16 has an internal profile which is complementary to the external profile of the bush ends 22 and is dimensioned such that a collar 16 can be locked onto each bush end 22 in the manner shown in FIGS. 5 to 7, namely such that there is only a minimum axial clearance between the external profile of the bush end 22 and the internal profile of the collar 16, although there is a radial clearance which is so great before the inner bush 20 is pressed into the bush 14 that a perceptible clearance also remains when the inner bush 20 has been pressed into the bush 14, with all the diameters of the bush 14 having increased slightly. The radial and axial clearance thus remaining between each of the bush ends 22 and the locked-on collar 16 guarantees that the bushes 14 are rotatable within the collars 16 and that this is also maintained during the entire service life of the joint member 10.

The inner bushes 20 are preferably only pushed into the plastics bushes 14 when the joint member 10 has been otherwise finished by vulcanising the elastic envelope 18 and subsequent deburring. This has the advantage that joint members 10 can be frozen in batches, subsequently deburred in a rotating drum and finally brought to ambient temperature again and dried before the inner bushes 20, which generally consist of stainless steel, are pressed in.

According to FIG. 6 and FIG. 7, a ring seal 40 can be disposed around the two front faces 26 of each of the bushes 14, namely either at the front side of the collar 16 according to FIG. 6 or in the gap between the collar 16 and the first cylindrical portion 28 of the bush end 22 concerned according to FIG. 7. In both cases ring seals 40 of this kind can prevent dirt from penetrating into the gap between the collars 16 and the bush ends 22 during operation of the joint member 10 and thereby impeding the rotatability of the bushes 14 within the collars and causing the connection to expand.

The collars 16 can be provided in the usual way with axially parallel holes 42 which, when the elastic envelope 18 is vulcanised, ensure that rubber penetrates sufficiently into the interspace between collars 16 associated in pairs. The holes 42 also improve the firm adhesion of the collars 16 to the elastic envelope 18. Detachment of the elastomer at high rotational speeds is therefore counteracted.

A feature which is shared by all the described embodiments of the joint member 10 is that its reinforcement has a small inert mass on account of the low density of the reinforcement materials. Given a permissible eccentricity of the arrangement of the reinforcement (sets of loops 12, bushes 14, collars 16), the original imbalance of the joint member 10 which occurs is consequently low.

The described measures also facilitate recycling of the materials of the joint member 10: After pressing out the steel inner bushes 20, the joint member 10 can be recycled by grinding, shredding or similar size reduction processes on account of the similar material properties of its other component parts (elastomer, thread, plastics reinforcement). On the other hand, conventional joint discs with steel reinforcement can only be disposed of pyrotechnically.

The invention claimed is:

1. Elastic joint member (10) with
   at least one set of loops (12),
   at least two bushes (14), which extend transversely through the set of loops (12),
   collars (16), which are fastened to a respective bush end (22) in order to axially support the set of loops (12) on the relevant bush (14), and
   an elastomeric envelope (18), in which the set of loops (12) and the bushes (14) are embedded at least in part,
   characterized in that
   the areas of the bushes (14) which are left free by the collars (16) and embedded in the envelope (18) are smooth, and
   the collars (16) are elastic being snap fitted and locked onto the associated bush (14) with the collars and bushes having complementary mating surfaces limiting relative movement therebetween along the longitudinal axis of the associated bush while having a clearance such that the bush is rotatable within the collars, white these are connected in a fixed manner to the envelope (18).

2. Joint member according to claim 1,
   characterized in that
   the bushes (14) each have two bush ends (22), which between them define a bush main part (24) and, in each case axially from the outside inwards, comprise the following annular faces:
   a front face (26), a first cylindrical portion (28), the outside diameter of which is reduced with respect to the bush main part (24), a recess (30), which has a further reduced diameter and is axially defined on one side by a first shoulder (32) which is remote from the front face (26) and on the other side by a conical face (34) which increases in diameter with the distance from this shoulder (32), and a second shoulder (36), which faces the first shoulder (32) and represents a sudden increase in diameter over the outside diameter of the first cylindrical portion (28), and that the collars (16) have an internal profile which is complementary to these bush ends (22).

3. Joint member according to claim 2, characterized in that, between their conical face (34) and their second shoulder (36), the bush ends (22) have a respective second cylindrical portion (38) which corresponds in its outside diameter with the first cylindrical portion (28).

4. Joint member according to claim 2, characterized in that a respective ring seal (40) is disposed around the front faces (26) of the bushes (14) and prevents dirt from penetrating between the bush (14) and the collar (16).

5. Joint member according to claim 2, characterized in that the bushes (14) consist of plastics material and each enclose an inner bush (20) of metal which is pressed into them.

6. Joint member according to claim 2, characterized in that the bushes (14) have a polished surface at least in the areas in which they are embedded in the elastomeric envelope (18).

* * * * *

UNITED STATES PATENT AND TRADEMARK OFFICE
CERTIFICATE OF CORRECTION

PATENT NO. : 7,871,331 B2
APPLICATION NO. : 11/814743
DATED : January 18, 2011
INVENTOR(S) : Werner Wähling et al.

It is certified that error appears in the above-identified patent and that said Letters Patent is hereby corrected as shown below:

On page 1, in the Assignee Section, please change

"SGF Suddeutshe Gelenksheibenfabrik GmbH & Co. KG, Waldkraiburg (DE)" to

--SGF Sueddeutsche Gelenkscheibenfabrik GmbH & Co. KG, Waldkraiburg (DE)--

Signed and Sealed this
Nineteenth Day of April, 2011

David J. Kappos
*Director of the United States Patent and Trademark Office*